United States Patent
Ozaki et al.

(10) Patent No.: US 11,797,362 B2
(45) Date of Patent: Oct. 24, 2023

(54) DATA PROCESSING SYSTEM, DATA PROCESSING APPARATUS, AND RECORDING MEDIUM

(71) Applicant: Mitsubishi Electric Corporation, Tokyo (JP)

(72) Inventors: Motoyuki Ozaki, Tokyo (JP); Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1 day.

(21) Appl. No.: 17/619,248

(22) PCT Filed: Aug. 30, 2019

(86) PCT No.: PCT/JP2019/034086
§ 371 (c)(1),
(2) Date: Dec. 15, 2021

(87) PCT Pub. No.: WO2021/038820
PCT Pub. Date: Mar. 4, 2021

(65) Prior Publication Data
US 2022/0283884 A1   Sep. 8, 2022

(51) Int. Cl.
*G06F 9/54*   (2006.01)
(52) U.S. Cl.
CPC .................................. *G06F 9/546* (2013.01)
(58) Field of Classification Search
None
See application file for complete search history.

(56) References Cited

U.S. PATENT DOCUMENTS 7,421,696 B2 * 9/2008 Bowie-Britton ....... G06Q 10/10
                                                        707/999.1
9,319,362 B1 * 4/2016 McAllister .............. H04L 12/54
(Continued)

FOREIGN PATENT DOCUMENTS

GB           2350758 A  *  6/1999  ............. G06Q 30/02
JP      2010-165172 A        7/2010
(Continued)

OTHER PUBLICATIONS

International Search Report and Written Opinion dated Nov. 26, 2019, received for PCT Application PCT/JP2019/034086, Filed on Aug. 30, 2019, 7 pages including English Translation.
(Continued)

*Primary Examiner* — Charles E Anya
(74) *Attorney, Agent, or Firm* — XSENSUS LLP

(57) ABSTRACT

A data processing apparatus (10) includes multiple data processors (300) that each perform a set subprocess of multiple sequential subprocesses included in a process sequence and a data distributor (210) that mediates data exchange between the multiple data processors (300) in accordance with a publish-subscribe model. An ID checker (330) determines, based on identification information assigned to received data received from the data distributor (210), whether received data is to be processed in the subprocess set to be performed by the data processor (300). A data processing executor (340) performs the set subprocess when the ID checker (330) determines that the received data is to be processed in the set subprocess. A data converter (310) assigns new identification information to data resulting from the set subprocess performed by the data processing executor (340) and transmits the data assigned with the new identification information to the data distributor (210).

6 Claims, 18 Drawing Sheets

(56) References Cited

U.S. PATENT DOCUMENTS

| | | | |
|---|---|---|---|
| 2003/0135556 A1* | 7/2003 | Holdsworth | H04L 9/40 |
| | | | 709/206 |
| 2005/0138632 A1* | 6/2005 | Groetzner | G06F 9/546 |
| | | | 719/313 |
| 2007/0027915 A1 | 2/2007 | Morris | |
| 2012/0151498 A1* | 6/2012 | Furneaux | G06F 9/546 |
| | | | 719/314 |
| 2015/0046531 A1 | 2/2015 | Sakae | |
| 2020/0092236 A1* | 3/2020 | Hawker | H04L 51/212 |

FOREIGN PATENT DOCUMENTS

| | | |
|---|---|---|
| JP | 2013-38647 A | 2/2013 |
| WO | 2013/145467 A1 | 10/2013 |

OTHER PUBLICATIONS

Notice of Reasons for Refusal dated Jul. 14, 2020, received for Japanese Application 2020-516940, 6 pages.
Notice of Reasons for Refusal dated Nov. 10, 2020, received for Japanese Application 2020-516940, 7 pages.
Decision to Grant dated Mar. 2, 2021, received for Japanese Application 2020-516940, 5 pages.

\* cited by examiner

FIG.6

ID STORAGE

320

| PRECEDING PROCESS | CURRENT PROCESS |
|---|---|
| P101 | P102 |

FIG.7

- HEADER

ID_0

- TEXT OF MESSAGE

XXXXXXXXXXXXXXXXXXXX

FIG.9A

ID STORAGE 320A

| PRECEDING PROCESS | CURRENT PROCESS |
|---|---|
| P000 | P101 |

FIG.9B

ID STORAGE 320B

| PRECEDING PROCESS | CURRENT PROCESS |
|---|---|
| P101 | P102 |

FIG.9C

ID STORAGE 　　　　/⁻320C

| PRECEDING PROCESS | CURRENT PROCESS |
|---|---|
| P102 | P103 |

DATA PROCESSING SYSTEM, DATA PROCESSING APPARATUS, AND RECORDING MEDIUM

CROSS-REFERENCE TO RELATED APPLICATION

The present application is based on PCT filing PCT/JP2019/034086, filed Aug. 30, 2019, the entire contents of which are incorporated herein by reference.

TECHNICAL FIELD

The present disclosure relates to a data processing system, a data processing apparatus, a data processing method, and a program.

BACKGROUND ART

Patent Literature 1 describes an information processing system including a data processing apparatus. The data processing apparatus performs predetermined processing on data transmitted by a working device serving as a data generator and transmits the processed data to another working device serving as a data user. In this information processing system, the working device as a data generator, the data processing apparatus, and the working device as a data user exchange data in accordance with a publish-subscribe model. The data processing apparatus includes a broker that mediates data exchange in accordance with the publish-subscribe model and a control flow function that performs predetermined processing on data.

The working device as a data generator publishes generated data to a predetermined channel set with a broker. The broker thus passes data to a control flow function subscribing to the channel. When the control flow function publishes processed data to another channel set with the broker, the broker passes the data to another working device subscribing to the channel. In the information processing system described in Patent Literature 1, two processors exchange data through a predetermined channel. This structure enables one-to-one data exchange between two processors.

CITATION LIST

Patent Literature

Patent Literature 1: Unexamined Japanese Patent Application Publication No. 2010-165172

SUMMARY OF INVENTION

Technical Problem

In the structure described in Patent Literature 1, multiple channels are to be set with a broker to process data in a predetermined order. FIG. 15 shows an example setting of multiple channels with a broker for cooperative processing between multiple processors. As illustrated, channels X and Y are set with a broker B1. A processor A2 subscribes to the channel X, and a processor A3 subscribes to the channel Y. When a processor A1 publishes data to the channel X, the broker B1 distributes the data to the processor A2. The processor A2 processes data received from the channel X. When the processor A2 publishes the processed data to the channel Y, the broker B1 distributes the data to the processor A3. The processor A3 processes data received from the channel Y. The multiple channels set with the broker B1 in this manner enables data distribution to the processors in a predetermined order.

A change in the data processing sequence causes a change in the setting with the broker, such as addition or deletion of channels. This change also causes a change in the setting with each processor, such as the channel subscribed to by the processor or to which the processor publishes data. For example, the process sequence may be changed as shown in FIG. 16, in which a processor A4 newly added processes data processed by the processor A2, and the processed data is then provided to the processor A3.

In this case, the setting is to be changed in the manner described below. A channel Z is newly added to the broker B1. The setting with the processor A4 is changed to subscribe to the channel Y. The setting with the processor A4 is also changed to publish processed data to the channel Z. The channel subscribed to by the processor A3 is changed to the channel Y. In this manner, a change in the data processing sequence causes a change in the channel setting with the broker and a change in the setting with each processor, such as the channel subscribed to by the processor or to which the processor publishes data. In the structure described in Patent Literature 1, the setting change increases the workload of the user.

In response to the above issue, an objective of the present disclosure is to provide a simple messaging system using a publish-subscribe model in which multiple processors sequentially process data in cooperation with one another.

Solution to Problem

To achieve the above objective, a data processing system according to an aspect of the present disclosure includes a plurality of data processing means each for performing a set subprocess of a plurality of sequential subprocesses included in a process sequence, and distribution means for mediating data exchange between the plurality of data processing means in accordance with a publish-subscribe model. Each of the plurality of data processing means includes determination means for determining, based on identification information assigned to received data received from the distribution means, whether the received data is to be processed in the subprocess set to be performed by the data processing means, process execution means for performing the set subprocess when the determination means determines that the received data is to be processed in the set subprocess, and transmission means for assigning new identification information to data resulting from the set subprocess performed by the process execution means and for transmitting the data assigned with the new identification information to the distribution means.

Advantageous Effects of Invention

A data processing system according to the above aspect of the present disclosure includes data processing means for determining, based on identification information assigned to received data received from distribution means, whether the data is to be processed in a subprocess set to be performed by the data processing means. When determining that the received data is to be processed in the subprocess, the data processing means performs the subprocess on the received data, assigns new identification information to data resulting from the subprocess, and transmits the data assigned with the new identification information to the distribution means. This simple structure allows multiple processors to sequentially process data in cooperation with one another in messaging using a publish-subscribe model.

BRIEF DESCRIPTION OF DRAWINGS

FIG. 6 is a table showing example data registered with an identification (ID) storage in the embodiment;

FIG. 7 is a diagram of an example message in the embodiment;

FIG. 9A is a table showing example data registered with the ID storage in the embodiment;

FIG. 9B is a table showing another example data registered with the ID storage in the embodiment;

FIG. 9C is a table showing another example data registered with the ID storage in the embodiment;

DESCRIPTION OF EMBODIMENTS

Embodiments

A data processing apparatus according to an embodiment of the present disclosure will now be described in detail with reference to the drawings.

Figure 1:
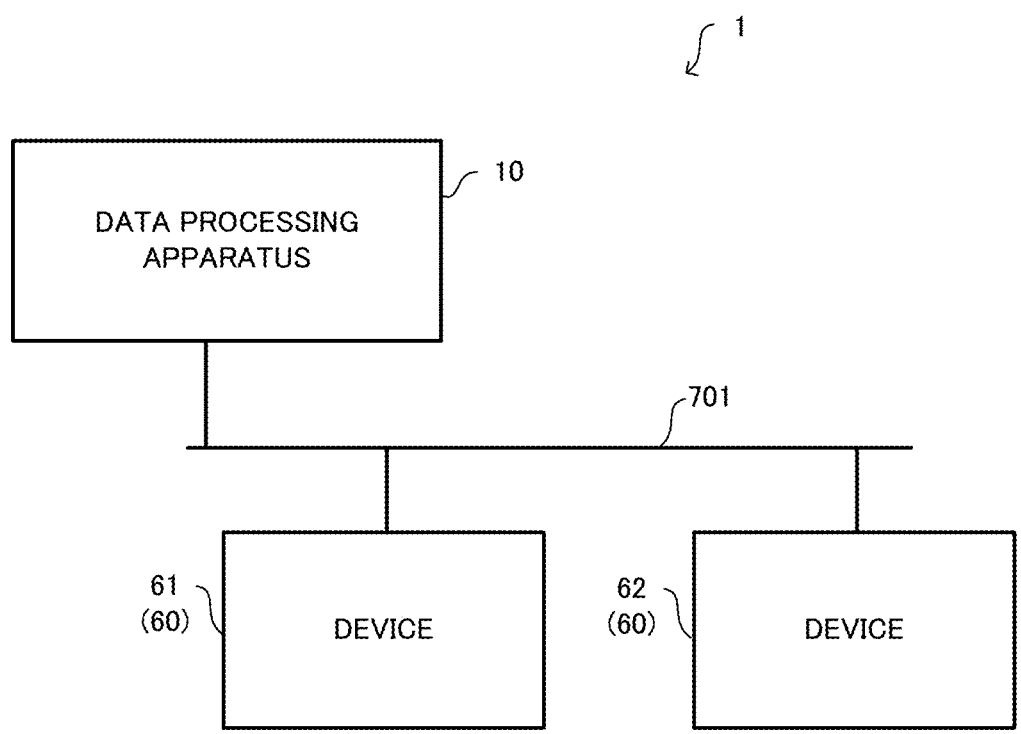
FIG. 1 is a block diagram of a data processing system according to an embodiment of the present disclosure.

As shown in FIG. 1, for example, a data processing apparatus 10 according to the embodiment is connected to devices 61 and 62 with a network 701 to form a data processing system 1. In the embodiment, the data processing apparatus 10 is, for example, an industrial personal computer (IPC) installed in the same factory as the devices 61 and 62. The devices 61 and 62 are, for example, factory automation (FA) devices such as actuators and robots. The devices 61 and 62 may be hereafter referred to as devices 60. The network 701 complies with, for example, field network standards.

The data processing apparatus 10 collects data from the devices 60. The data is acquired by sensors included in the devices 60. Examples of the sensors included in the devices 60 include a vibration sensor, a temperature sensor, a pressure sensor, and a flow rate sensor. The data processing apparatus 10 collects, for example, data from the devices 60 and performs various data processing operations, such as data processing or analysis, on the collected data.

The data processing apparatus 10 includes multiple processors that perform a series of processes in cooperation with one another. In the example shown in FIG. 2, the data processing apparatus 10 performs a process sequence P100 including sequential subprocesses P101 to P105 defined by a user.

The process sequence P100 includes subprocesses performed on data output from the devices 60. The arrows in FIG. 2 indicate data transmission. For example, the subprocess P101 is a process of collecting data from the devices 60, and the subprocess P105 is a process of outputting data. For example, data collected from the devices 60 in the subprocess P101 is processed in the subprocess P102. The data processed in the subprocess P102 is processed in the subprocess P103 and then in the subprocess P104. The processed data is then transmitted to the subprocess P105 for output to, for example, a device external to the data processing apparatus 10.

The data processing apparatus 10 includes setting data indicating the defined details about the process sequence and performs processing in accordance with the defined process sequence setting. More specifically, the processors included in the data processing apparatus 10 perform predetermined subprocesses in a predetermined order.

In the embodiment, the processors in the data processing apparatus 10 that perform the subprocesses exchange data in accordance with a publish-subscribe model. The functions of each processor are implemented by, for example, a corresponding application.

In the publish-subscribe model, an application that transmits messages is referred to as a publisher, and an application that receives messages is referred to as a subscriber. An application that mediates data exchange between the publisher and the subscriber is referred to as a broker.

Figure 3:
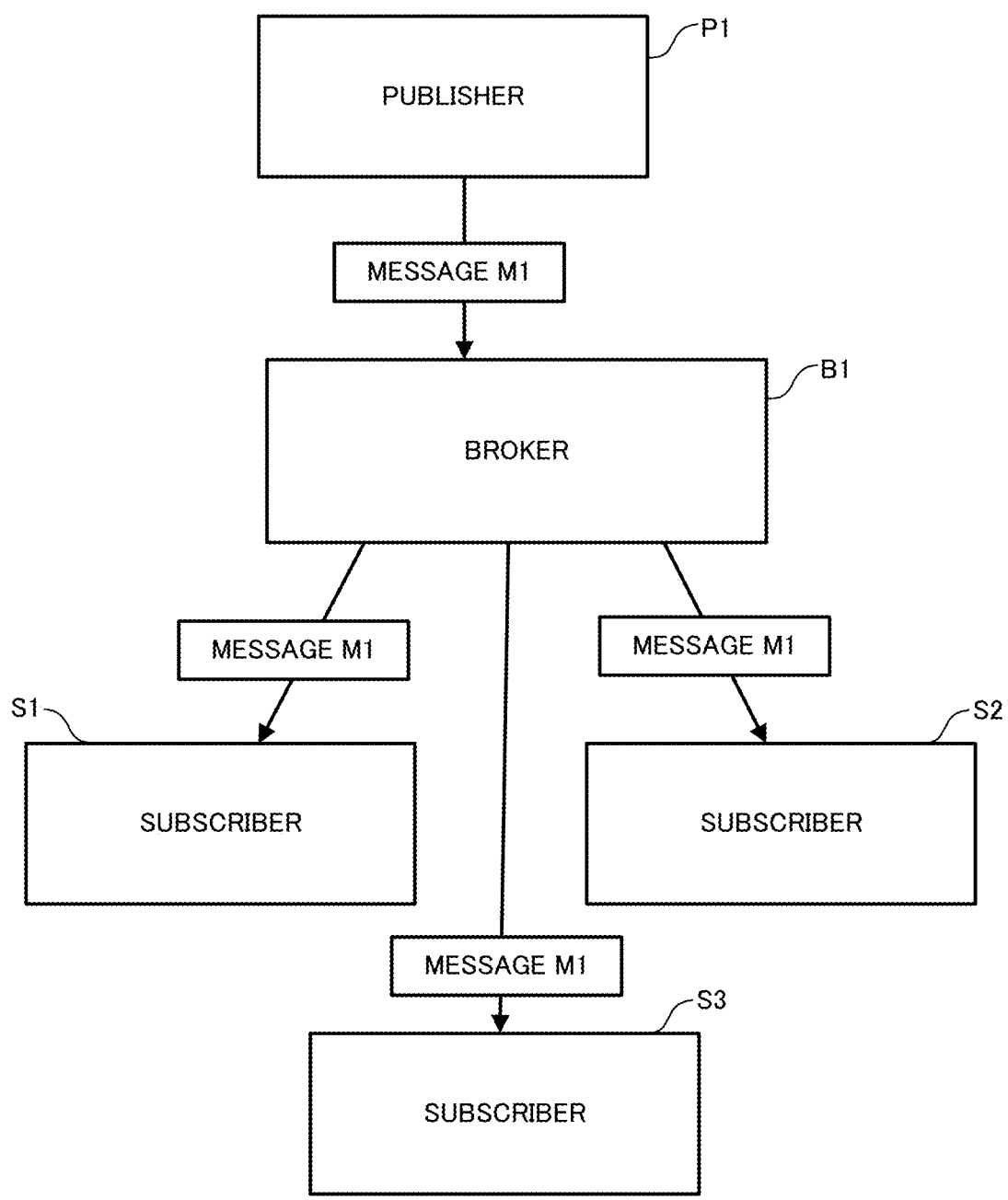
FIG. 3 is a diagram describing messaging using a publish-subscribe model in an embodiment.

FIG. 3 shows example messaging using a publish-subscribe model. As illustrated, a publisher P1 generates a message M1 and transmits the generated message M1 to a broker B1. Transmission of the message M1 from the publisher P1 may be referred to as publication. Subscribers S1, S2, and S3 request subscription of messages from the broker B1. Reception of published messages by the subscribers S1, S2, and S3 may be referred to as subscription. The broker B1 transmits the message M1 published by the publisher P1 to the subscribers S1, S2, and S3 requesting subscription of the message M1.

In the messaging using the publish-subscribe model, the publisher P1 transmits the message M1 without specifying the receiver of the message M1. The subscribers S1, S2, and S3 receive the message M1 without specifying the transmitter of the message M1. The messaging using the publish-subscribe model reduces the degree of coupling between the publisher P1 and each of the subscribers S1, S2, and S3, while increasing system scalability. In contrast, a message transmitter cannot transmit a message to a specific receiver alone, and a message receiver cannot specify a message transmitter.

As described above, the multiple processors in the data processing apparatus 10 sequentially perform the subprocesses. The processors are to perform the subprocesses in the order defined with the process sequence. In the embodiment, data exchanged between the processors in the data processing apparatus 10 is assigned with identification information for identifying the progress of the process sequence. More specifically, the identification information specifies the preceding subprocess performed on the data. Each processor determines based on the identification information whether the received data is to be processed by the processor.

Figure 4:
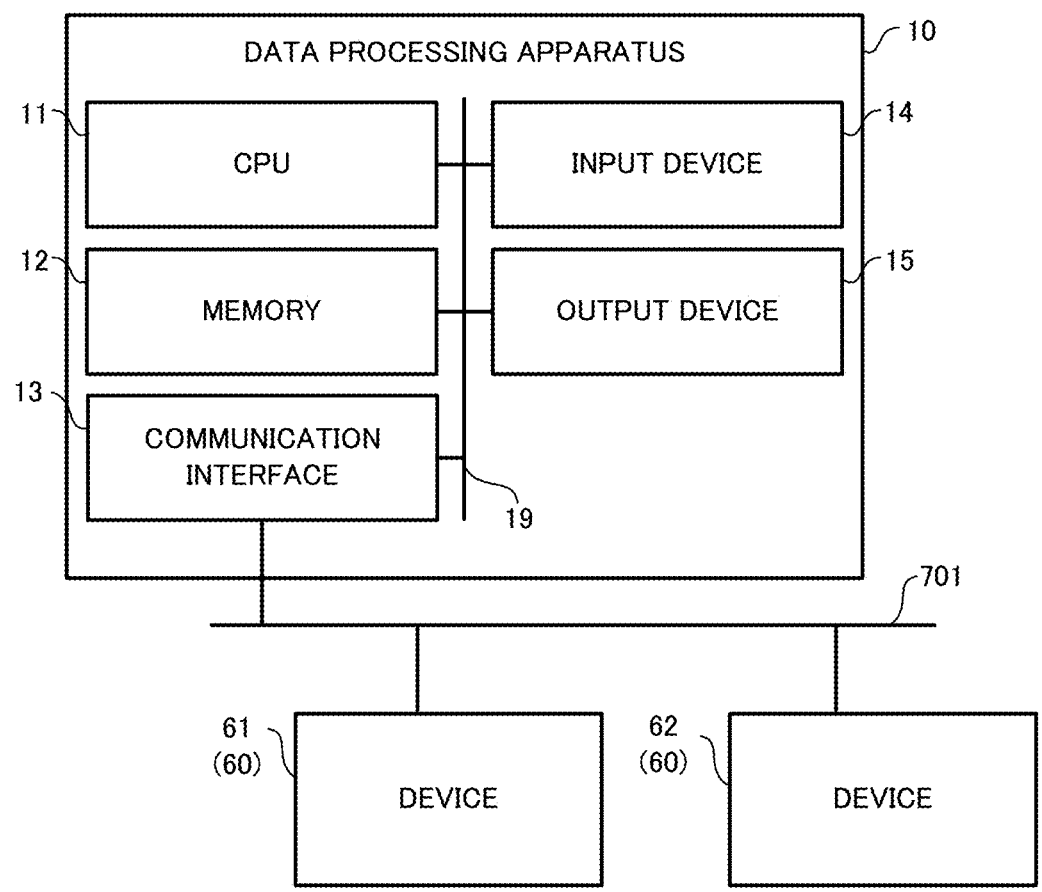
FIG. 4 is a block diagram of a data processing apparatus according to the embodiment, showing the hardware configuration.

As shown in FIG. 4, the data processing apparatus 10 includes, as hardware components, a central processing unit (CPU) 11 that centrally controls the data processing apparatus 10, a memory 12 that stores various programs and data, a communication interface 13 that communicates with other devices through the network 701, and an input device 14 and an output device 15 serving as user interfaces. The memory 12, the communication interface 13, the input device 14, and the output device 15 are connected to the CPU 11 with a bus 19 to communicate with the CPU 11.

The CPU 11 executes programs stored in the memory 12 to perform the process described later.

The memory 12 includes a volatile memory and a non-volatile memory.

The memory 12 stores programs for implementing various functions of the data processing apparatus 10. The memory 12 is used as a work memory for the CPU 11.

The communication interface 13 includes a network interface circuit and communicates with the devices 60 through the network 701 under the control of the CPU 11.

The input device 14 includes, for example, an input key and a pointing device. The input device 14 receives operation inputs from a user and outputs signals indicating the operation inputs from the user to the CPU 11. The user is, for example, a manager of the data processing apparatus 10.

The output device 15 includes, for example, a display and a speaker. The output device 15 displays images based on the signals provided from the CPU 11 on the display. The output device 15 outputs, from the speaker, sounds based on the signals provided from the CPU 11.

Figure 5:
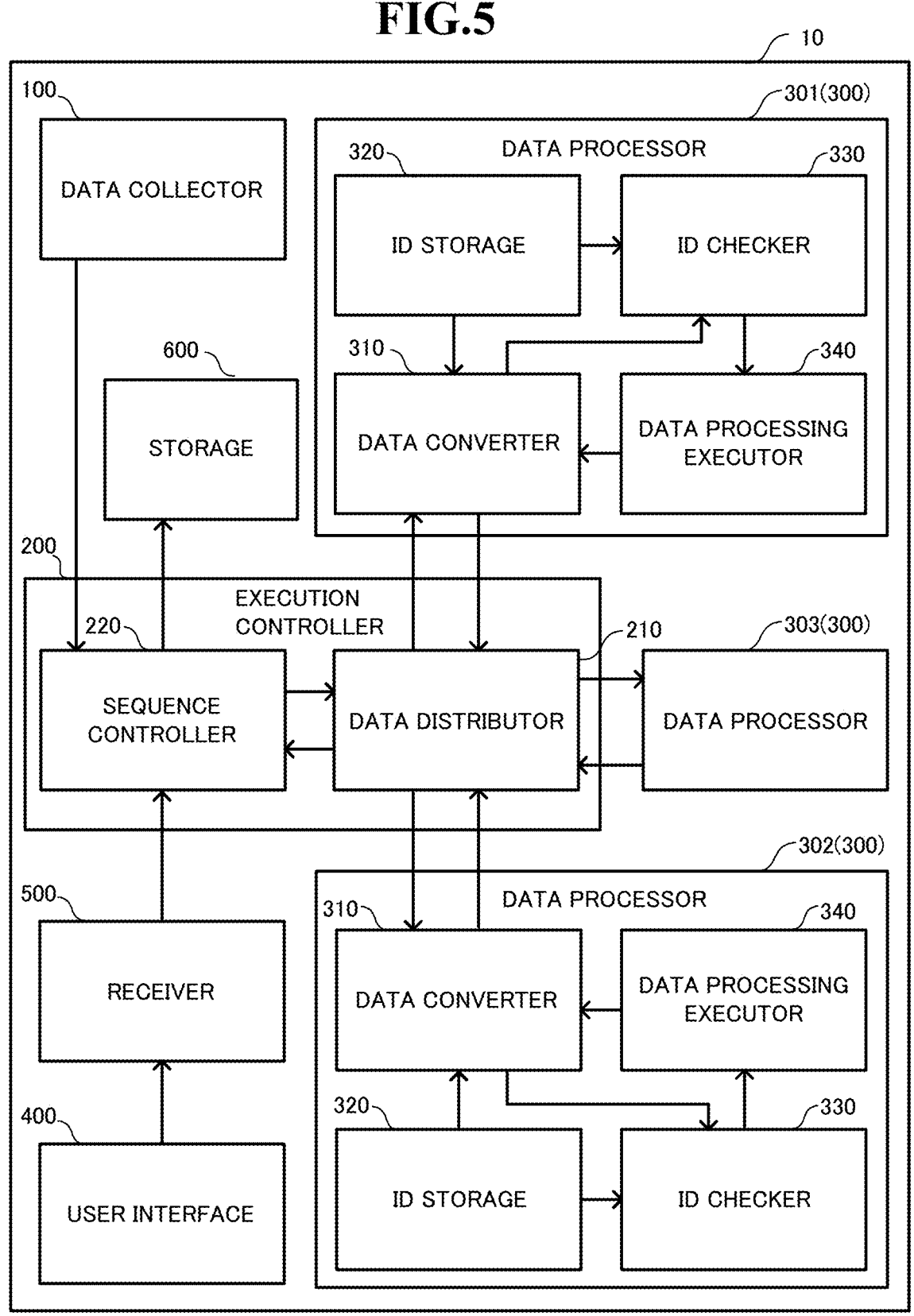
FIG. 5 is a functional block diagram of the data processing apparatus according to the embodiment.

As shown in FIG. 5, the data processing apparatus 10 includes, as functional components, a data collector 100 that collects data from the devices 60, an execution controller 200 that controls the process sequence, data processors 300 that perform the subprocesses, a user interface 400 that provides and receives information to and from a user, a receiver 500 that receives the setting of the process sequence, and a storage 600 that stores various items of data. In FIG. 5, the arrows indicate the directions of data or signal flow between the components in the data processing apparatus 10.

The data collector 100 collects data from the devices 60. The data is acquired by sensors included in the devices 60. The data collector 100 collects, for example, specified data from a specified target at specified collection intervals. The data collector 100 provides the collected data to the execution controller 200. The functions of the data collector 100 are mainly implemented by the CPU 11 and the communication interface 13 shown in FIG. 4. The data collector 100 is an example of collection means in an aspect of the present disclosure.

The execution controller 200 shown in FIG. 5 includes a data distributor 210 and a sequence controller 220. The functions of the execution controller 200 are mainly implemented by the CPU 11 shown in FIG. 4.

The data distributor 210 shown in FIG. 5 operates as a broker in the publish-subscribe model and mediates data exchange between the data processors 300. The sequence controller 220 described below operates as a publisher. Each data processor 300 operates as both a publisher and a subscriber. The data distributor 210 distributes a message including data received from the sequence controller 220 to the data processors 300. The data received by the data distributor 210 from the sequence controller 220 is collected by the data collector 100 from the devices 60. The data distributor 210 also distributes a message including data received from a data processor 300 and processed in a subprocess to another data processor 300. When determining based on the identification information assigned to the data received from each data processor 300 that all the subprocesses are complete, the data distributor 210 outputs the data to the sequence controller 220. The data distributor 210 is an example of data distribution means in an aspect of the present disclosure.

The sequence controller 220 outputs the message including data provided from the data collector 100 to the data distributor 210 in accordance with the defined setting of the process sequence. The process sequence is set in the manner described below. The receiver 500 (described later) receives the process sequence setting from a user and notifies the sequence controller 220 of the process sequence setting. The sequence controller 220 stores data indicating the notified process sequence setting into the storage 600. When receiving a message including data processed in the subprocesses performed by all the data processors 300 from the data distributor 210, the sequence controller 220 outputs, for example, an instruction based on the processing result to the devices 60. In another example, the sequence controller 220 may activate a predetermined application depending on the processing result. In still another example, when receiving a message including data processed in the subprocesses performed by all the data processors 300 from the data distributor 210, the sequence controller 220 may provide the processing result indicated by the received data to a user. The sequence controller 220 is an example of sequence control means in an aspect of the present disclosure.

Each data processor 300 performs, on data included in a message received from the data distributor 210, a subprocess set to be performed by the data processor 300, and transmits a message including the data processed in the subprocess to the data distributor 210. The data received from the data distributor 210 is an example of received data in an aspect of the present disclosure. In the example shown in FIG. 5, the data processors 300 include data processors 301, 302, and 303. For example, the data processor 301 performs a process 1. The data processor 302 performs a process 2. The data processor 303 analyzes data processed by the data processor 302. The processes 1 and 2 are preprocesses to be performed before data analysis.

The specific functions of the data processors 300 will now be described.

Each data processor 300 includes a data converter 310, an ID storage 320, an ID checker 330, and a data processing executor 340. The functions of the data processor 300 are mainly implemented by the CPU 11 and the memory 12 shown in FIG. 4. Each data processor 300 is an example of data processing means in an aspect of the present disclosure.

Each data converter 310 shown in FIG. 5 operates as an interface that transmits and receives messages to and from the data distributor 210. The data converter 310 converts data included in the message received from the data distributor 210 into a form processible by the data processing executor 340 (described later).

As shown in FIG. 7, for example, the message received by the data converter 310 from the data distributor 210 includes a header and the text of the message. The text of the message includes data to be processed by the data processor 300. The header includes an ID. As described above, data exchanged between the data processors 300 in the data processing apparatus 10 is assigned with identification information for identifying the progress of the process sequence. The ID functions as the identification information for identifying the progress of the process sequence. The ID may be any value, for example, a numerical value sequentially incremented from an initial value, or may include a numerical value and a character string.

When receiving a message from the data distributor 210, the data converter 310 shown in FIG. 5 separates the received message into the text of the message and a header. The data converter 310 extracts the ID from the header and outputs the ID to the ID checker 330. The data converter 310 also outputs the text of the message to the data processing executor 340.

When receiving processed data from the data processing executor 340, the data converter 310 generates a message. More specifically, the data converter 310 places the processed data into the text of the message and the ID in the current process into the header to generate a message. The current process ID is notified to the data converter 310 from the ID checker 330 (described later). The data converter 310 transmits the generated message to the data distributor 210. The data converter 310 is an example of transmission means in an aspect of the present disclosure.

The ID storage 320 stores the association between the ID in the current process in which the data processing executor 340 performs the subprocess and the ID assigned to the process preceding the current process. The current process ID specifies the subprocess to be performed by the data processing executor 340. The preceding process ID specifies the subprocess set to be performed on data to be processed in the subprocess performed by the data processing executor 340 immediately before the subprocess. For example, as shown in FIG. 6, the ID storage 320 stores data associating the ID indicating the preceding process with the ID indicating the current process. The ID assigned to data received by one data processor 300 is assigned by another data processor 300 that has performed the preceding subprocess. Data assigned with the preceding process ID indicates that the data is to be processed in the subprocess of the data processor 300 receiving the data.

The data processor 300 that performs a first subprocess performs the subprocess on unprocessed data. More specifically, this data is provided from the data collector 100 to the data distributor 210 through the sequence controller 220. In this case, the ID storage 320 included in the data processor 300 that performs the first subprocess stores, as a preceding process ID, an ID indicating that the data has yet to be processed in any subprocess. The sequence controller 220 assigns this ID to the data. The preceding process ID is an example of first identification information in an aspect of the present disclosure. The current process ID is an example of second identification information in an aspect of the present disclosure. The ID storage 320 is an example of storage means in an aspect of the present disclosure.

The ID checker 330 determines whether the ID output from the data converter 310 is stored in the ID storage 320. More specifically, when the ID included in the header matches the preceding process ID stored in the ID storage 320, the ID checker 330 determines that the data included in the message received from the data distributor 210 is processed in the preceding subprocess and thus is to be processed. The ID checker 330 notifies the data processing executor 340 of the determination result. The ID checker 330 also notifies the data converter 310 of the current process ID.

When the ID included in the header is not stored in the ID storage 320 as the preceding process ID, the ID checker 330 determines that the data included in the message received from the data distributor 210 is not to be processed. The ID checker 330 notifies the data processing executor 340 of the determination result. The ID checker 330 is an example of determination means in an aspect of the present disclosure.

When the result notified from the ID checker 330 indicates that the text of the message output from the data converter 310 is to be processed, the data processing executor 340 performs a preset subprocess on the text of the message. For example, the data processing executor 340 in the data processor 301 performs the process 1. The data processing executor 340 outputs the processed data to the data converter 310. When the result notified from the ID checker 330 indicates that the text of the message output from the data converter 310 is not to be processed, the data processing executor 340 abandons the text of the message. The data processing executor 340 is an example of data processing execution means in an aspect of the present disclosure.

The user interface 400 functions as a user interface. For example, the user interface 400 notifies the receiver 500 of the setting of the process sequence input by a user. The user interface 400 also presents information provided from the execution controller 200 through the receiver 500 to the user. The functions of the user interface 400 are mainly implemented by the input device 14 and the output device 15 shown in FIG. 4.

The receiver 500 shown in FIG. 5 receives the setting of the process sequence through the user interface 400 and notifies the execution controller 200 of the process sequence setting. The receiver 500 outputs information provided from the execution controller 200 to the user interface 400. The functions of the receiver 500 are mainly implemented by the CPU 11 shown in FIG. 4.

The storage 600 shown in FIG. 5 stores data used for the operations of the data processing apparatus 10, including the setting data about the process sequence. The functions of the storage 600 are mainly implemented by the memory 12 shown in FIG. 4.

The operation of each data processor 300 receiving a message from the data distributor 210 will now be described. First, when receiving data from the data collector 100, the sequence controller 220 places the received data into the text of the message and places the ID indicating that the data has yet to be processed in any subprocess into the header to generate a message shown in FIG. 7. As shown in FIG. 5, the sequence controller 220 transmits the generated message to the data distributor 210. When receiving the message from the sequence controller 220, the data distributor 210 distributes the message to each data processor 300 serving as a subscriber.

Figure 8:
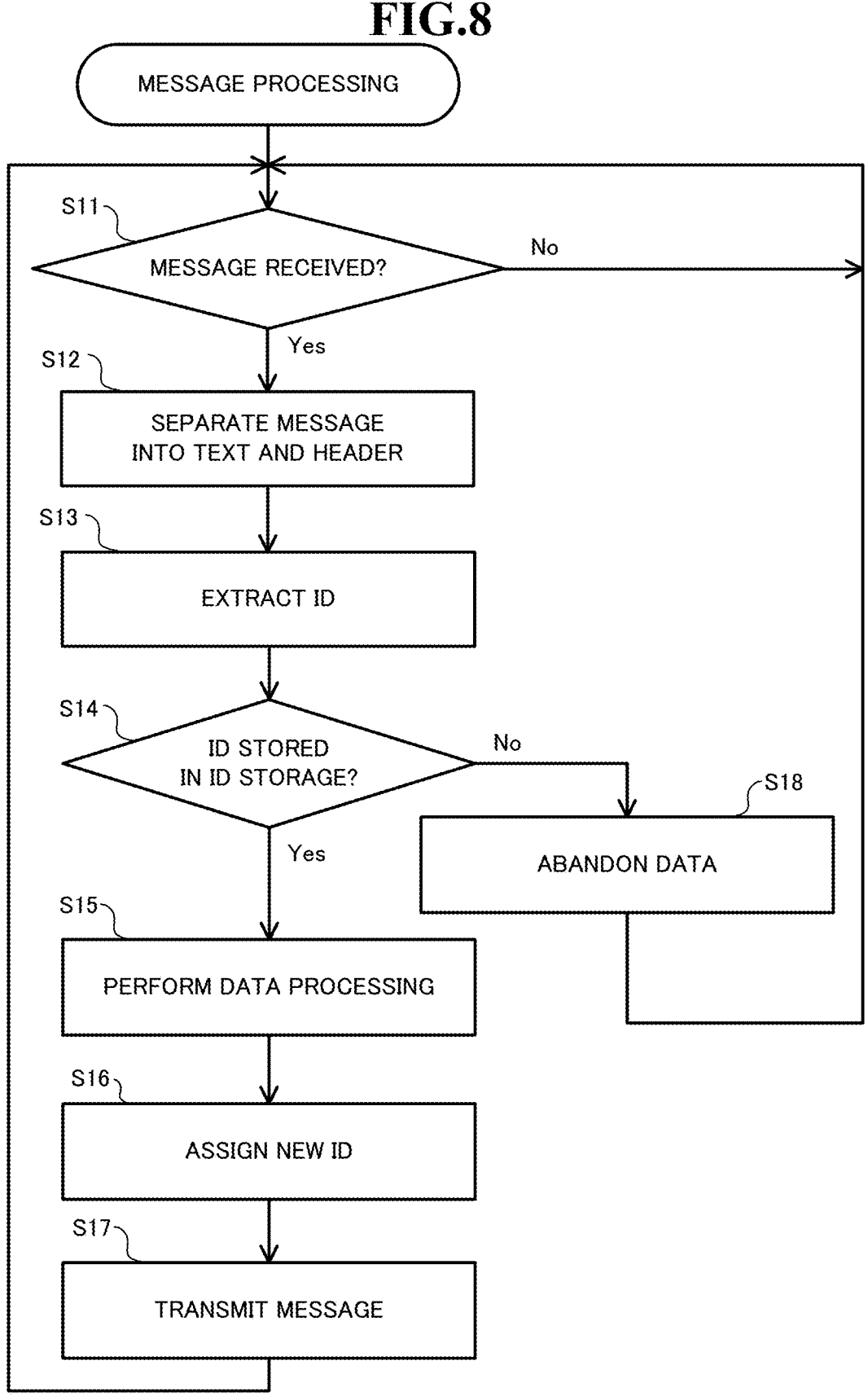
FIG. 8 is a flowchart of message processing performed by a data processor in an embodiment.

As shown in FIG. 8, when receiving a message from the data distributor 210 (Yes in step S11), the data converter 310 separates the received message into the text of the message and the header (step S12). The data converter 310 extracts the ID from the header (step S13) and outputs the ID to the ID checker 330. The data converter 310 also outputs the text of the message to the data processing executor 340.

The ID checker 330 determines whether the ID output from the data converter 310 is stored in the ID storage 320 (step S14). When the ID is stored in the ID storage 320 as the preceding process ID (Yes in step S14), the ID checker 330 notifies the data processing executor 340 that the message received from the data distributor 210 is to be processed. In this case, the data processing executor 340 performs a subprocess on data included in the text of the message output from the data converter 310 (step S15). The data processing executor 340 outputs the processed data to the data converter 310.

The data converter 310 assigns the current process ID to the processed data output from the data processing executor 340 (step S16). More specifically, the data converter 310 places the processed data output from the data processing executor 340 into the text of the message and places the current process ID stored in the ID storage 320 into the header to generate a message. The data converter 310 transmits the generated message to the data distributor 210 (step S17). When receiving the message from a data processor 300, the data distributor 210 distributes the message to another data processor 300.

In step S14, when determining that the ID is not stored in the ID storage 320 as the preceding process ID (No in step S14), the ID checker 330 notifies the data processing executor 340 of the result. In this case, the data processing executor 340 abandons the data (step S18). The data converter 310 then performs the process in step S11 again. Each data processor 300 operates in this manner.

An example data flow in the data processing apparatus 10 according to the embodiment will now be described. In the example, the ID P101 indicates the process 1 performed by the data processor 301, the ID P102 indicates the process 2 performed by the data processor 302, and the ID P103 indicates the analysis performed by the data processor 303. The ID P000 indicates that no subprocess has been performed. The collected data is defined to be processed in the process 1, the process 2, and the analysis in this order. The sequence controller 220 prestores the ID indicating that no subprocess has been performed and the ID indicating the subprocess to be performed by the data processor 303 as the last process.

For ease of explanation, the ID storage 320 included in the data processor 301 is an ID storage 320A. The ID storage 320 included in the data processor 302 is an ID storage 320B. The ID storage 320 included in the data processor 303 is an ID storage 320C. The ID storage 320A included in the data processor 301 stores data shown in FIG. 9A. The ID storage 320B included in the data processor 302 stores data shown in FIG. 9B. The ID storage 320C included in the data processor 303 stores data shown in FIG. 9C.

Figure 10:
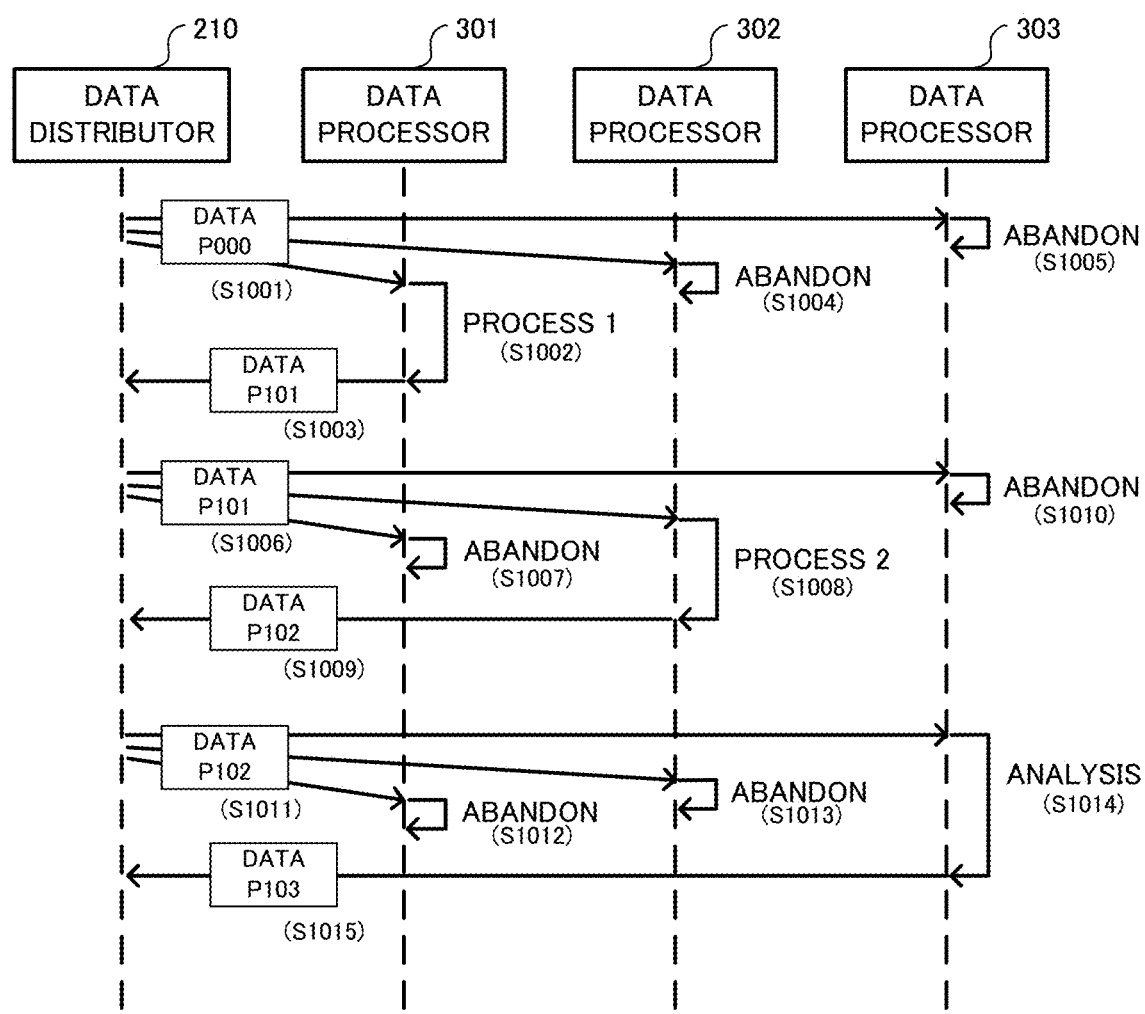
FIG. 10 is a diagram describing an example flow of data exchanged between data distributors in the embodiment.

When receiving data from the data collector 100, the sequence controller 220 assigns the ID P000 to the data and outputs a message including the data to the data distributor 210. Thus, as shown in FIG. 10, the data distributor 210 distributes the data to the data processors 301, 302, and 303 (S1001).

When receiving the data assigned with the ID P000, the data processor 301 refers to the ID storage 320A shown in FIG. 9A to determine whether the received data is to be processed. When ID P000 matching the preceding process ID stored in the ID storage 320A, the ID checker 330 in the data processor 301 determines that the received data is to be processed. Thus, as shown in FIG. 10, the data processing executor 340 in the data processor 301 performs the process 1 (S1002). The data converter 310 in the data processor 301 assigns the current process ID P101 stored in the ID storage 320A shown in FIG. 9A to the data processed in the process 1 and transmits a message including the data assigned with the ID to the data distributor 210 (S1003).

When receiving the data assigned with the ID P000, the data processor 302 refers to the ID storage 320B shown in FIG. 9B to determine whether the received data is to be processed. When the ID P000 does not match the preceding process ID stored in the ID storage 320B, the ID checker 330 in the data processor 302 determines that the received data is not to be processed. Thus, as shown in FIG. 10, the data processing executor 340 in the data processor 302 abandons the data (S1004).

When receiving data assigned with the ID P000, the data processor 303 refers to the ID storage 320C shown in FIG. 9C to determine whether the received data is to be processed. When the ID P000 does not match the preceding process ID stored in the ID storage 320C, the ID checker 330 in the data processor 303 determines that the received data is not to be processed. Thus, as shown in FIG. 10, the data processing executor 340 in the data processor 303 abandons the data (S1005).

When receiving the data from the data processor 301, the data distributor 210 distributes the data to the data processors 301, 302, and 303 (S1006).

When receiving data assigned with the ID P101, the data processor 301 refers to the ID storage 320A shown in FIG. 9A to determine whether the received data is to be processed. When the ID P101 does not match the preceding process ID stored in the ID storage 320A, the ID checker 330 in the data processor 301 determines that the received data is not to be processed. Thus, as shown in FIG. 10, the data processing executor 340 in the data processor 301 abandons the data (S1007).

When receiving the data assigned with the ID P101, the data processor 302 refers to the ID storage 320B shown in FIG. 9B to determine whether the received data is to be processed. When the ID P101 matching the preceding process ID stored in the ID storage 320B, the ID checker 330 in the data processor 302 determines that the received data is to be processed. Thus, as shown in FIG. 10, the data processing executor 340 in the data processor 302 performs the process 2 (S1008). The data converter 310 in the data processor 302 assigns the current process ID P102 stored in the ID storage 320B shown in FIG. 9B to the data processed in the process 2 and transmits a message including data assigned with the ID to the data distributor 210 (S1009).

When receiving the data assigned with the ID P101, the data processor 303 refers to the ID storage 320C shown in FIG. 9C to determine whether the received data is to be processed. When the ID P101 does not match the preceding process ID stored in the ID storage 320C, the ID checker 330 in the data processor 303 determines that the received data is not to be processed. Thus, as shown in FIG. 10, the data processing executor 340 in the data processor 303 abandons the data (S1010).

When receiving the data from the data processor 302, the data distributor 210 distributes the data to the data processors 301, 302, and 303 (S1011).

When receiving the data assigned with the ID P102, the data processor 301 refers to the ID storage 320A shown in FIG. 9A to determine whether the received data is to be processed. When the ID P102 does not match the preceding process ID stored in the ID storage 320A, the ID checker 330 in the data processor 301 determines that the received data is not to be processed. Thus, as shown in FIG. 10, the data processing executor 340 in the data processor 301 abandons the data (S1012).

When receiving the data assigned with the ID P102, the data processor 302 refers to the ID storage 320B shown in FIG. 9B to determine whether the received data is to be processed. When the ID P102 does not match the preceding process ID stored in the ID storage 320B, the ID checker 330 in the data processor 302 determines that the received data is not to be processed. Thus, as shown in FIG. 10, the data processing executor 340 in the data processor 302 abandons the data (S1013).

When receiving the data assigned with the ID P102, the data processor 303 refers to the ID storage 320C shown in FIG. 9C to determine whether the received data is to be processed. When the ID P102 matching the preceding process ID stored in the ID storage 320C, the ID checker 330 in the data processor 303 determines that the received data is to be processed. Thus, as shown in FIG. 10, the data processing executor 340 in the data processor 303 performs an analysis (S1014).

The analysis may use a predetermined number of data pieces. In this case, the data processor 303 may accumulate the predetermined number of data pieces processed by the data processor 302 before performing the analysis.

The data converter 310 in the data processor 303 assigns the current process ID P103 stored in the ID storage 320C shown in FIG. 9C to the data indicating the analysis result and transmits a message including the data assigned with the ID to the data distributor 210 (S1015).

When the data distributor 210 receiving the data assigned with the ID P103 indicating the last process performed by the data processors 300, the sequence controller 220 outputs an image indicating the analysis result to the user interface 400 through the receiver 500. The user can thus view the analysis result. The embodiment has the above structure.

As described above, each data processor 300 in the data processing apparatus 10 determines whether data is to be processed in the subprocess depending on whether the ID storage 320 stores the ID assigned to the data received from the data distributor 210 as the ID indicating the preceding process. When determining based on the ID assigned to the data that the data is to be processed in the subprocess, each data processor 300 performs the subprocess and transmits the data assigned with the ID indicating the current process to the data distributor 210. When determining that the data is not to be processed in the subprocess, the data processor 300 does not perform the subprocess.

In the manner described above, each data processor 300 can determine, based on the ID assigned to the data, whether the data is to be processed. Thus, multiple processors can sequentially process data in cooperation with one another in the publish-subscribe model-based messaging in which data transmitters are unspecified. In the embodiment, each data processor 300 assigns the ID indicating the identification information for identifying the progress of the process sequence to the processed data. This simple structure enables data processing in accordance with the defined process sequence.

Each data processor 300 processes data in accordance with the process sequence defined based on the ID. Thus, the data distributor 210 that operates as a broker simply distributes data. For example, unlike in the structure described in Patent Literature 1, multiple channels are not set with the broker to control the order of data distribution. Any change in the process sequence simply causes a change in the setting with the data processor 300 for adjustment to the resultant process sequence without any change in the setting with the data distributor 210 that operates as a broker. For example, an application that operates on a server provided by an external system provider may serve as the data distributor 210 that operates as a broker. In this case, the broker may distribute the published data to all the data processors 300 to easily adjust the data processors 300 to, for example, a change in the process order when a data processor 300 is added or deleted.

Modification 1

In the embodiment, each data processor 300 performs a single subprocess, but each data processor 300 may perform two or more subprocesses. In this case, as shown in FIG. 11, the ID storage 320 included in the data processor 300 stores data defining the subprocess for each combination of the preceding process and the current process.

Figure 11:
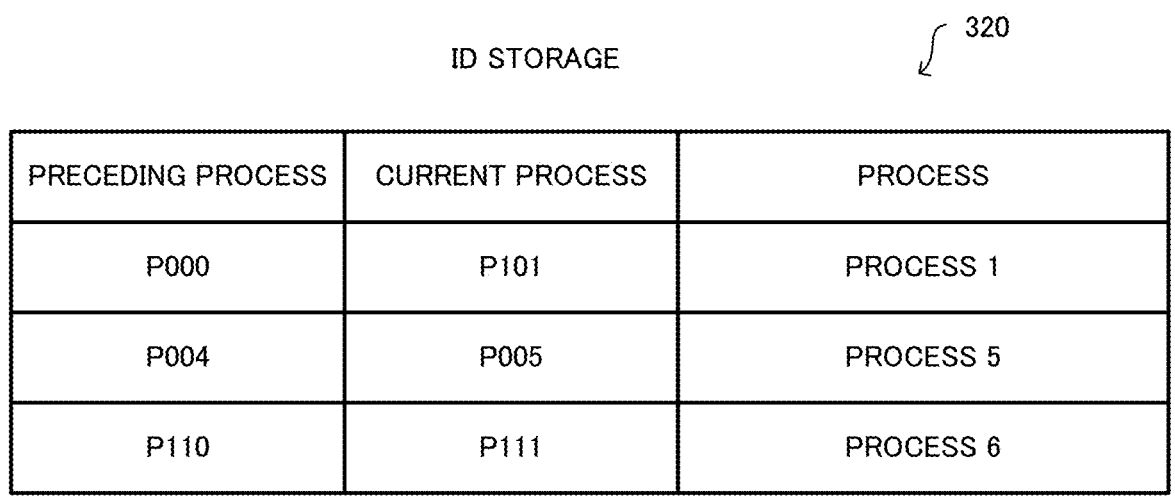
FIG. 11 is a table showing example data registered with an ID storage in Modification 1.

In this case, when the ID included in the header matches any of the preceding process IDs stored in the ID storage 320 shown in FIG. 11, the ID checker 330 determines that the data included in the message received from the data distributor 210 is to be processed. The ID checker 330 notifies the data processing executor 340 of the subprocess associated with the preceding process ID. Thus, the data processing executor 340 performs the notified subprocess. The ID checker 330 notifies the data converter 310 of the corresponding current process ID. The data converter 310 adds the current process ID to the data processed in the subprocess performed by the data processing executor 340 and transmits the data to the data distributor 210.

For example, when the ID P004 is included in the header, the ID checker 330 notifies the data processing executor 340 of the corresponding process 5. Thus, the data processing executor 340 performs the process 5. The data converter 310 assigns the ID P005 to the processed data for transmission to the data distributor 210.

When the ID included in the header does not match any of the preceding process IDs stored in the ID storage 320 shown in FIG. 11, the ID checker 330 determines that the data received from the data distributor 210 is not to be processed and notifies the data processing executor 340 of the determination result. Thus, the data processing executor 340 abandons the data.

Modification 2

In the embodiment, each data processor 300 separates the header from the message to delete the preceding process ID from the message and adds the current process ID to the data processed in the subprocess. However, the structure is not limited to this example.

The data processor 300 may place the current process ID into the header without deleting the preceding process ID from the message. Thus, a new ID is additionally assigned to the header for every subprocess performed by the data processor 300. The data processor 300 may use, as the preceding process ID, the ID assigned last time among the IDs included in the header of the received message to determine whether the data is to be processed. In this structure, for example, the sequence controller 220 can determine whether the data processed in the last subprocess has been processed in all the processes defined in the process sequence.

Modification 3

Figure 2:
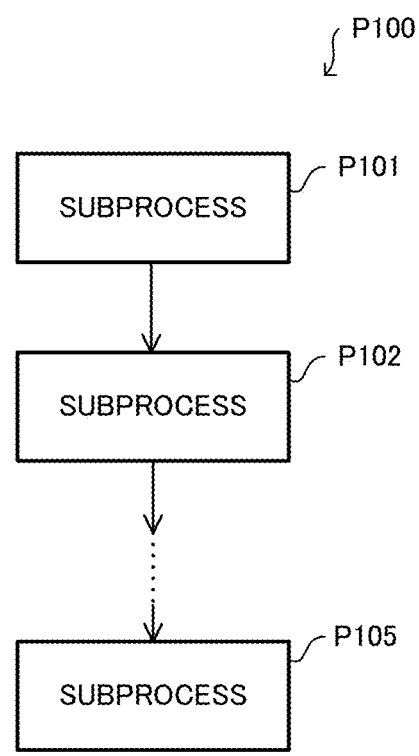
FIG. 2 is a diagram showing an example setting of a process sequence in the embodiment.
Figure 12:
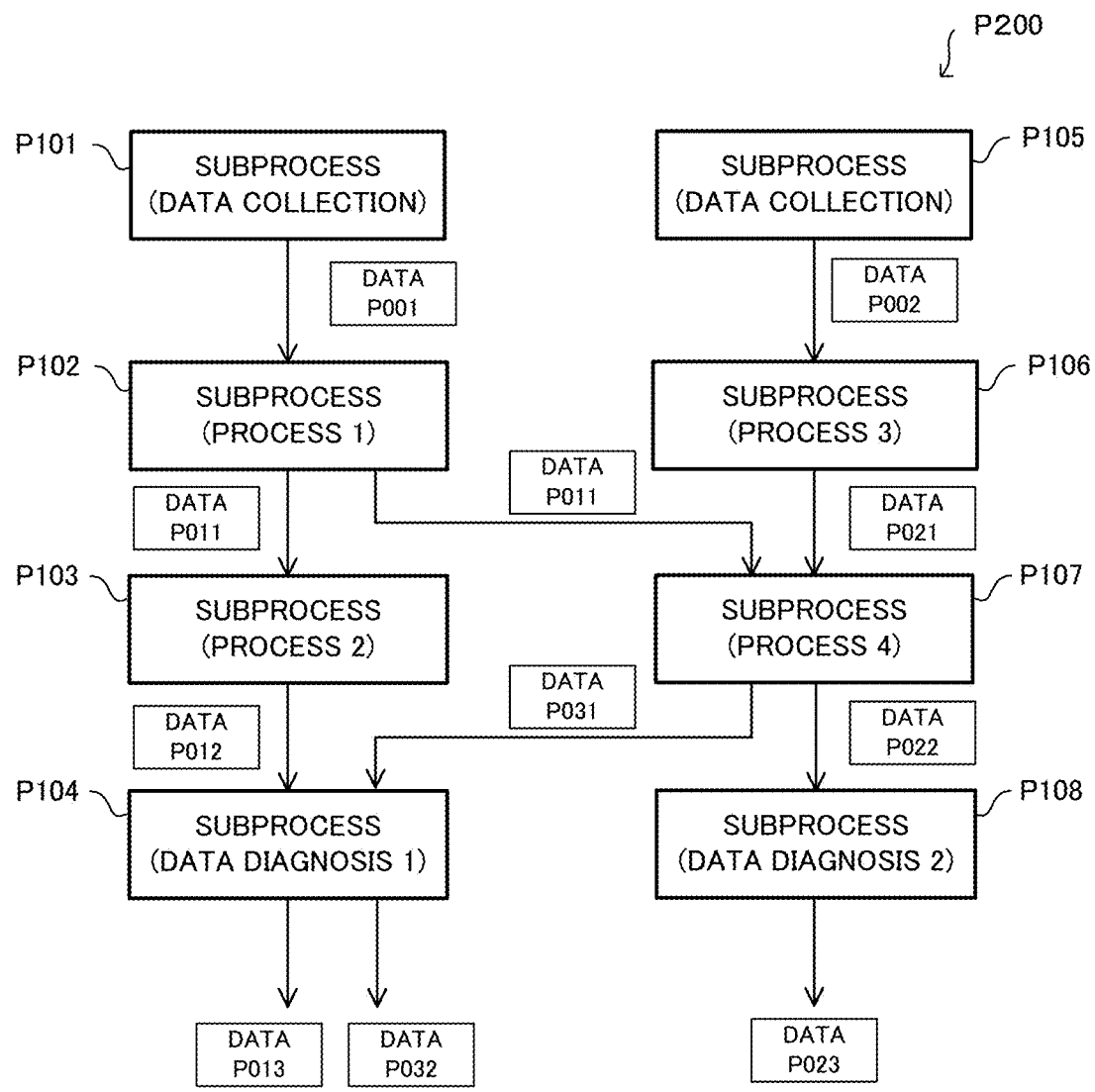
FIG. 12 is a diagram of another example process sequence in Modification 3.

In the embodiment, the process sequence shown in FIG. 2 has been described, but the process sequence is not limited to this example. FIG. 12 shows another example of the process sequence. In a process sequence P200 shown in FIG. 12, data collected in the subprocess P101 assigned with the ID P001 is passed to the subprocess P102.

In the subprocess P102, the data assigned with the ID P001 is processed in the subprocess P102 to be assigned with the ID P011. The resultant data is then passed to the subprocesses P103 and P107.

In the subprocess P103, the data assigned with the ID P011 is processed in the subprocess P103 to be assigned with the ID P012 and passed to the subprocess P104. In the subprocess P107, the data assigned with the ID P011 is processed in the subprocess P107 to be assigned with the ID P031 and passed to the subprocess P104.

In the subprocess P104, the data assigned with the ID P012 is processed in the subprocess P104 to be assigned with the ID P013 and output to the data distributor 210. The data assigned with the ID P031 is processed in the subprocess P104 to be assigned with the ID P032 and output to the data distributor 210.

Modification 4

Figure 13:
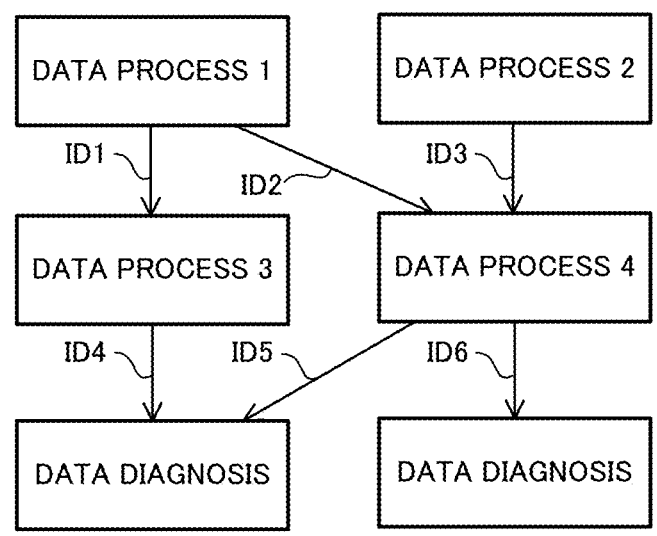
FIG. 13 is a diagram describing ID assignment to data in Modification 4.

In the embodiment and Modification 1, each ID indicates a different process, but the structure is not limited to this example. For example, the processes may be performed as shown in FIG. 13. In the illustrated example, the arrows indicate the order in which the subprocesses are performed. In Modification 4, the ID is allocated to each arrow connecting the processes.

In this example, ID1 is allocated to an arrow connecting the data process 1 to the data process 3. The data output from the data process 1 is assigned with ID1. The ID storage 320 in the data processor 300 that performs the data process 3 stores information defining that the data assigned with ID1 is to be processed in the data process 3. When receiving the data assigned with ID1, the ID checker 330 in the data processor 300 that performs the data process 3 determines based on the information stored in the ID storage 320 that the received data has been passed from the data process 1 to the data process 3. Thus, the ID checker 330 determines that the data process 3 is to be performed on the data. In this case, the data processing executor 340 performs the data process 3 on the data. When the ID assigned to the received data is other than ID1, the ID checker 330 in the data processor 300 that performs the data process 3 determines that the data is not to be processed. In this case, the data processing executor 340 abandons the data.

ID2 is allocated to an arrow connecting the data process 1 to the data process 4. ID3 is allocated to an arrow connecting the data process 2 to the data process 4.

The ID storage 320 in the data processor 300 that performs the data process 4 stores information defining that data assigned with ID2 and data assigned with ID3 are to be processed in the data process 4. When receiving data assigned with ID2 or ID3, the ID checker 330 in the data processor 300 that performs the data process 4 determines based on the information stored in the ID storage 320 that the data is to be processed in the data process 4. In this case, the data processing executor 340 performs the data process 4 on the data. When the ID assigned to the received data is none of ID2 and ID3, the ID checker 330 in the data processor 300 that performs the data process 4 determines that the data is not to be processed. Thus, the data processing executor 340 abandons the data.

As described above, the ID may specify that the data has been passed from the preceding subprocess to the subsequent subprocess.

The data processing apparatus 10 may include more than one data collector 100. The data processing apparatus 10 may include two data processors 300 or four or more data processors 300 instead of three data processors 300.

In the embodiment, the data processing apparatus 10 includes the data collector 100. However, for example, another apparatus connected to the data processing apparatus 10 with a network may function as the data collector 100. In this case, the data processing apparatus 10 receives, from the other apparatus, the data collected from the devices 60 by the other apparatus.

In another example, each data processor 300 may be partly or entirely installed in another apparatus connected to the data processing apparatus 10 with a network. The data distributor 210 that operates as a broker may be installed in another apparatus connected to the data processing apparatus 10 with a network. For example, an application that operates on a server provided by an external system provider may function as a broker. A service on a cloud may function as a broker.

In the embodiment, no topic is set with the broker, but a topic may be set with the broker. The topic indicates the subject of the information included in a message published by a publisher. The publisher can specify a topic to publish a message. A subscriber specifies a topic to request subscription of a message from a broker. The broker transmits the message published by the publisher to a subscriber subscribing to the topic.

Figure 14:
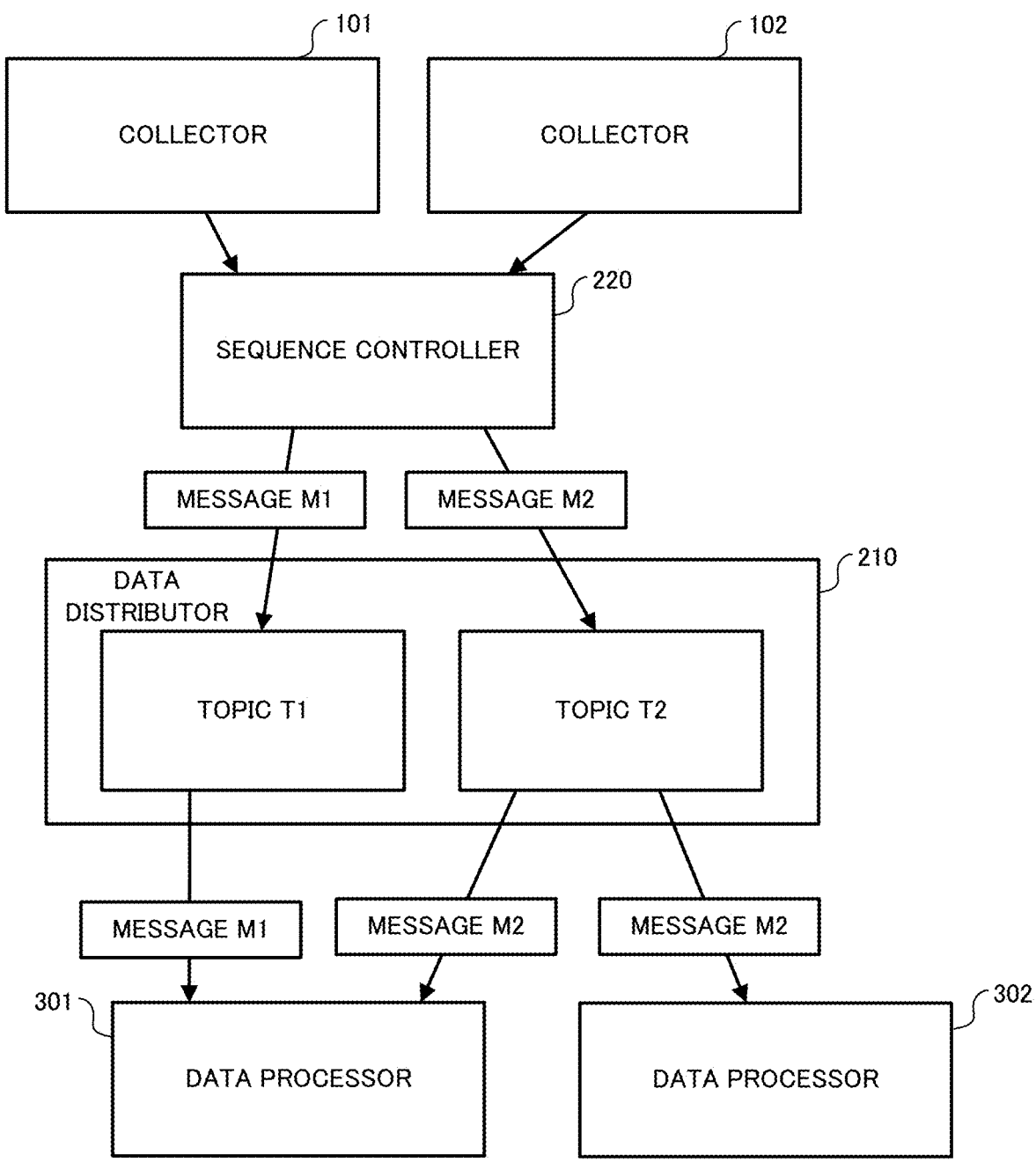
FIG. 14 is a diagram describing messaging using a publish-subscribe model with topics set with a broker.
Figure 15:
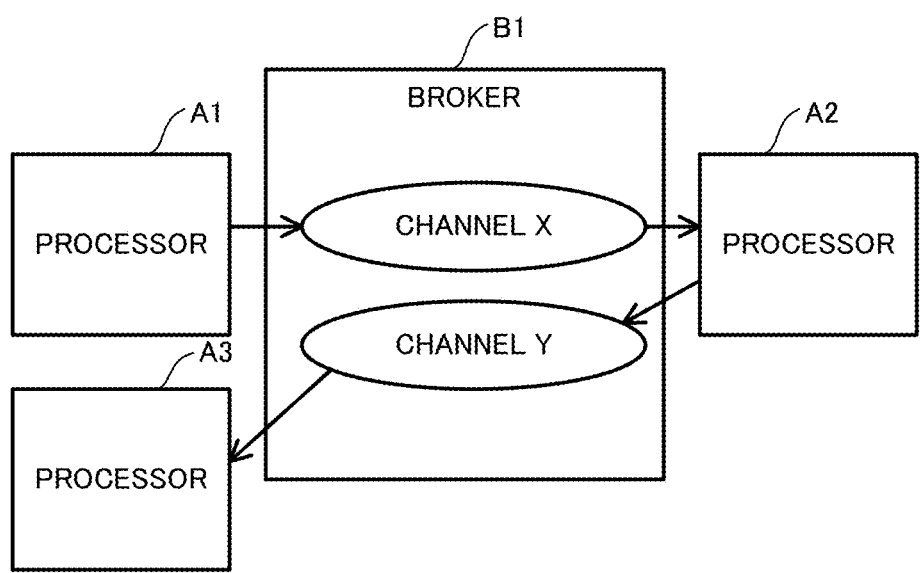
FIG. 15 is a diagram describing a known technique.
Figure 16:
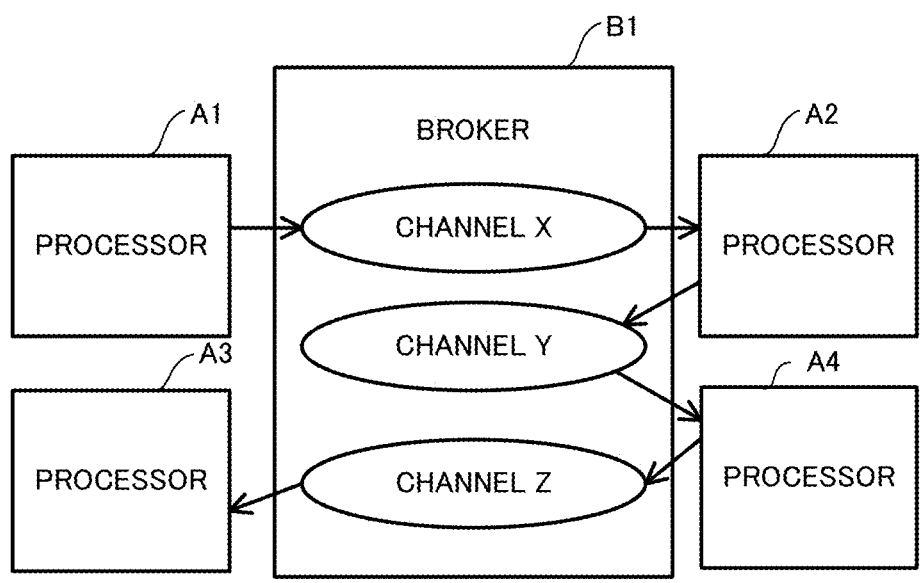
FIG. 16 is a diagram describing an issue in the known technique.

For example, the data processing apparatus 10 includes data collectors 101 and 102. As shown in FIG. 14, the sequence controller 220 receives data from the data collectors 101 and 102. Topics T1 and T2 are set with the data distributor 210 serving as a broker. The data processor 301 subscribes to the topics T1 and T2, and the data processor 302 subscribes to the topic T2.

For example, the sequence controller 220 publishes a message M1 including data provided from the data collector 101 to the topic T1 and publishes a message M2 including data provided from the data collector 102 to the topic T2. The sequence controller 220 assigns an ID to data included in each message. Thus, the data distributor 210 distributes, from the sequence controller 220, the message M1 published to the topic T1 to the data processor 301 and the message M2 published to the topic T2 to each of the data processors 301 and 302. The data processors 301 and 302 may each perform the subprocess based on the ID assigned to the data included in the received message.

Data may be stored into the ID storage 320 in each data processor 300 in any manner. For example, a user may register data in the ID storage 320 in each data processor 300 with the storage 600 in the data processing apparatus 10 through the user interface 400. In this case, the data processor 300 may read data to be used from the storage 600 after being activated. In another example, when the execution controller 200 activates the data processor 300, the execution controller 200 may specify data for a parameter provided to the data processor 300. In another example, the execution controller 200 may generate an ID stored in the ID storage 320 in accordance with the defined setting of the process sequence and provide the data about the generated ID to the data processor 300.

In the example shown in FIG. 10, a single piece of data is exchanged between the data processors 300. Instead, the data collector 100 may collect data pieces at short intervals and provide the collected data pieces to the sequence controller 220. In this case, for identification of individual data pieces, for example, the sequence controller 220 may assign, to each data piece, an ID that is a value including a combination of information of time at which the data piece is received from the data collector 100 and an ID indicating that no subprocess is performed on the data piece. For example, the sequence controller 220 receives data at 9:03:15. In this case, the sequence controller 220 may assign an ID assigned to 090315_P000 to the data. The data processor 300 may determine whether the data is to be processed based on a portion excluding the time information, or based on P000 in this case.

In the embodiment, the data collector 100 that collects data does not operate as a publisher. However, the data collector 100 may also operate as a publisher. In this case, the data collector 100 may publish a message including data to the data distributor 210 instead of transmitting data to the sequence controller 220.

Examples of a non-transitory recording medium that records the above programs include a non-transitory computer-readable recording medium, such as a magnetic disk, an optical disk, a magneto-optical disk, a flash memory, a semiconductor memory, and magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

A1, A2, A3 Processor
B1 Broker
M1, M2 Message
P100 Process sequence
P1 Publisher
P101, P102, P103, P104, P105 Subprocess
S1, S2, S3 Subscriber
T1, T2 Topic
X, Y Channel
1 Data processing system
10 Data processing apparatus
11 CPU
12 Memory
13 Communication interface
14 Input device
15 Output device
19 Bus
60, 61, 62 Device
100, 101, 102 Data collector
200 Execution controller
210 Data distributor
220 Sequence controller
300, 301, 302, 303 Data processor
310 Data converter
320, 320A, 320B, 320C ID storage
330 ID checker
340 Data processing executor
400 User interface
500 Receiver
600 Storage
701 Network

The invention claimed is:

1. A data processing system, comprising:
a plurality of data processors, each to perform a set subprocess of a plurality of sequential subprocesses included in a process sequence; and
a distributor to mediate data exchange between the plurality of data processors in accordance with a publish-subscribe model,
wherein each of the plurality of data processors includes
a storage to store, in association with each other, first identification information specifying a subprocess set to be performed on data to be processed in the set subprocess immediately before the set subprocess and second identification information specifying the set subprocess to be performed,
a determiner to determine, based on identification information assigned to received data received from the distributor, whether the received data is to be processed in the subprocess set to be performed by the data processor, and determine that the received data is to be processed in the set subprocess when the identification information assigned to the received data matches the first identification information,
a process executor to perform the set subprocess when the determiner determines that the received data is to be processed in the set subprocess, and
a transmitter to assign the second identification information as new identification information to data resulting from the set subprocess performed by the process executor and to transmit the data assigned with the second identification information to the distributor,
the data processing system further comprising a sequence controller to assign the identification information to data collected from a device and yet to be processed in a first subprocess included in the process sequence and to transmit the data assigned with the identification information to the distributor, wherein
the distributor distributes the data received from the sequence controller to each of the plurality of data processor,
when determining based on the identification information assigned to the received data that all the subprocesses set in the process sequence are complete, the distributor provides the resultant data to the sequence controller, and
the sequence controller outputs an instruction to the device based on the data for which all the subprocesses defined in the process sequence are complete.

2. The data processing system according to claim 1, wherein
the determiner determines that the received data is not to be processed in the set subprocess when the identification information assigned to the received data does not match the first identification information, and
the process executor abandons the received data when the determiner determines that the received data is not to be processed in the set subprocess.

3. The data processing system according to claim 1, wherein
when the determiner determines that the received data is to be processed in the set subprocess, the process executor deletes the first identification information from the received data and performs the set subprocess on the resultant data, and
the transmitter assigns the second identification information to data processed in the set subprocess performed by the process executor and transmits the data assigned with the second identification information to the distributor.

4. The data processing system according to claim 1, further comprising:
a collector to provide data collected from the device to the sequence controller.

5. A data processing apparatus, comprising:
a plurality of data processors, each to perform a set subprocess of a plurality of sequential subprocesses included in a process sequence; and
a distributor to mediate data exchange between the plurality of data processors in accordance with a publish-subscribe model,
wherein each of the plurality of data processors includes
a storage to store, in association with each other, first identification information specifying a subprocess set to be performed on data to be processed in the set subprocess immediately before the set subprocess and second identification information specifying the set subprocess to be performed, a determiner to determine, based on identification information assigned to received data received from the distributor, whether the received data is to be processed in the subprocess set to be performed by the data processor, and determine that the received data is to be processed in the set subprocess when the identification information assigned to the received data matches the first identification information, a process executor to perform the set subprocess when the determiner determines that the received data is to be processed in the set subprocess, and a transmitter to assign the second identification information as new identification information to data resulting from the set subprocess performed by the process executor and to transmit the data assigned with the second identification information to the distributor, the data processing apparatus further comprising a sequence controller to assign the identification information to data collected from a device and yet to be processed in a first subprocess included in the process sequence and to transmit the data assigned with the identification information to the distributor, wherein the distributor distributes the data received from the sequence controller to each of the plurality of data processor, when determining based on the identification information assigned to the received data that all the subprocesses set in the process sequence are complete, the distributor provides the resultant data to the sequence controller, and the sequence controller outputs an instruction to the device based on the data for which all the subprocesses defined in the process sequence are complete.

6. A non-transitory computer-readable recording medium storing a program, the program causing a computer to function as a plurality of data processors, each to perform a set subprocess of a plurality of sequential subprocesses included in a process sequence, and a distributor to mediate data exchange between the plurality of data processors in accordance with a publish-subscribe model, wherein the program causes each of the plurality of data processors to perform operations including:

storing, in association with each other, first identification information specifying a subprocess set to be performed on data to be processed in the set subprocess immediately before the set subprocess and second identification information specifying the set subprocess to be performed by the data processor, determining that the received data is to be processed in the set subprocess when the identification information assigned to the received data received from the distributor matches the first identification information, performing the set subprocess when the received data is to be processed in the set subprocess, assigning the second identification information as new identification information to data resulting from the set subprocess, transmitting the data assigned with the second identification information to the distributor, and assigning, by a sequence controller, the identification information to data collected from a device and yet to be processed in a first subprocess included in the process sequence and to transmit the data assigned with the identification information to the distributor, wherein the distributor distributes the data received from the sequence controller to each of the plurality of data processor, when determining based on the identification information assigned to the received data that all the subprocesses set in the process sequence are complete, the distributor provides the resultant data to the sequence controller, and the sequence controller outputs an instruction to the device based on the data for which all the subprocesses defined in the process sequence are complete.

* * * * *